INVENTOR.
Joseph Harbit Pool

BY
ATTORNEYS.

July 26, 1938.　　　　J. H. POOL　　　　2,125,198

PARACHUTE CONSTRUCTION

Filed Dec. 13, 1937　　　2 Sheets-Sheet 2

INVENTOR.
Joseph Harbit Pool

BY
ATTORNEYS.

Patented July 26, 1938

2,125,198

UNITED STATES PATENT OFFICE 2,125,198

PARACHUTE CONSTRUCTION

Joseph Harbit Pool, Cranwell, England, assignor to Irving Air Chute of Great Britain Limited, Letchworth, England, a British company Application December 13, 1937, Serial No. 179,577
In Great Britain October 12, 1936

4 Claims. (Cl. 244—142)

This invention relates to improvements in parachutes and has particular reference to an improved parachute canopy and rigging construction by reason of which the load will be permitted to glide during a parachute descent without appreciable oscillation.

The danger of parachute oscillation is well known to aviators and it is not infrequent that parachute jumpers are severely injured as a result of parachute oscillation at the time of making contact with the earth. Some attempts have been made to damp out the oscillation, the most noteworthy of which was the development by the United States Government of the so-called "triangular" parachute, shown in Patent #1,780,190. The disadvantages of this "triangular" parachute are that the canopy structure is extremely complicated, not only to manufacture, but so far as the problem of packing and safe launching are concerned. One of the principal objects of the present invention is to use a regulation circular type parachute canopy and automatically control the air spill from the canopy during a parachute descent, so as to damp oscillation, entirely through the line or rigging structure. This will permit the novice to use parachutes, since it takes considerable skill to manually damp out oscillations with a standard parachute.

A further object of this invention is the provision of a parachute having a circular type canopy with one or more suspension lines longer than the other lines so as to permit one portion of the parachute canopy to bulge upward during a parachute descent; thus permitting air spill at that point and consequently damping out oscillations.

A further object of the invention is the provision of an improved parachute structure having a preferably circular type of canopy with shroud cords progressively of varying dimension so that the canopy during descent will be given an angular tilt to the horizontal.

Other objects and advantages of the invention will be apparent during the course of the following detailed description.

In the accompanying drawings, forming a part of this specification, and wherein preferred and modified forms of the invention are shown, Figure 1 is a side elevation of a parachute supporting an aviator during a parachute descent; the improved parachute having a circular type of canopy with the supporting lines progressively of different dimensions.

Figure 1:
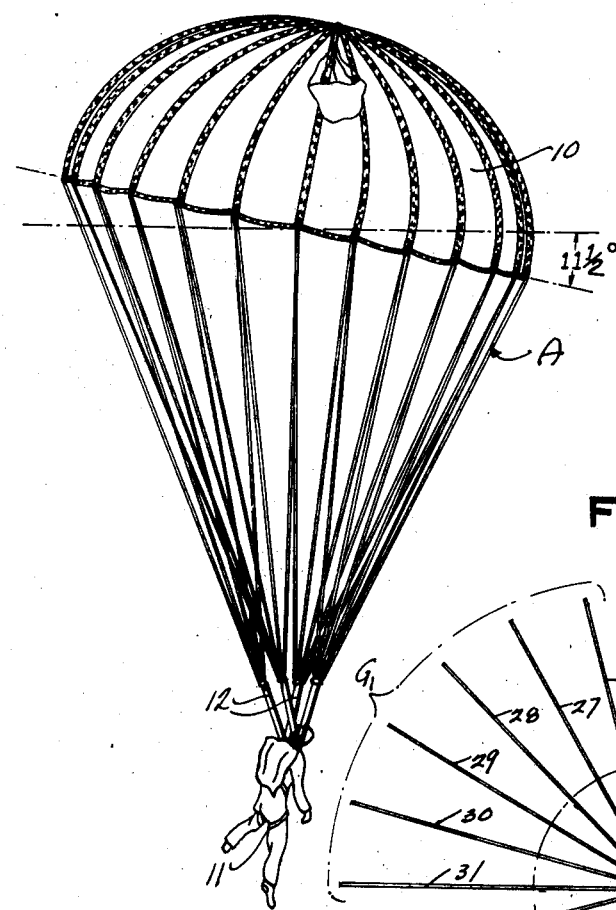
Figure 2:
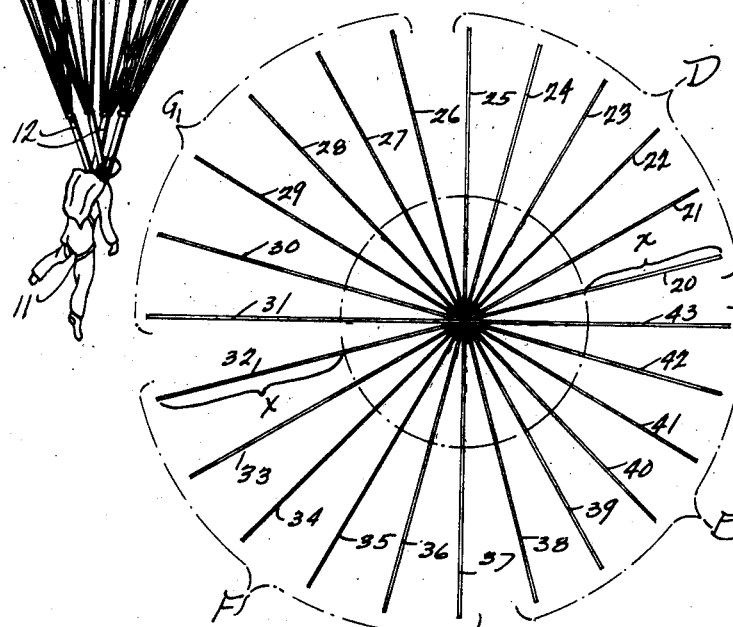
Figure 2 is a developed view of the shroud line structure of the improved parachute shown in Figure 1.
Figure 4:
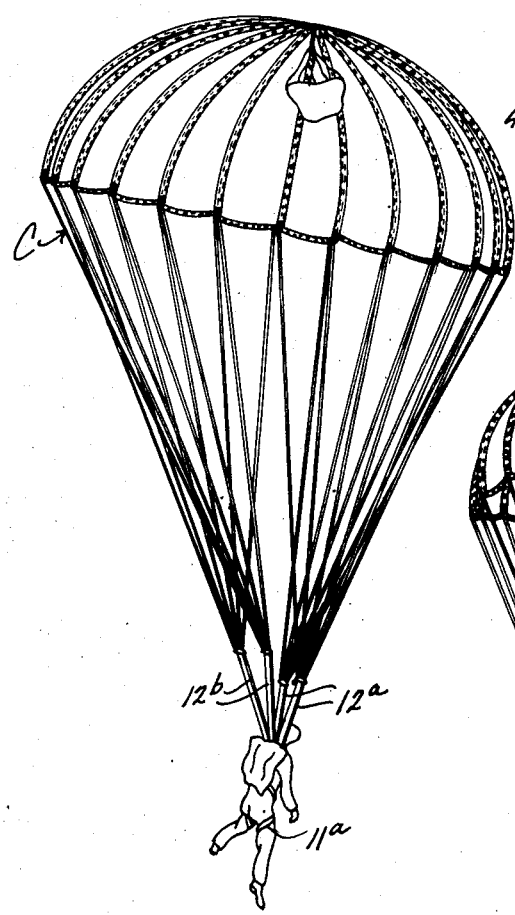
Figure 4 is a side elevation of a parachute construction supporting an aviator during a parachute descent; this construction employing a harness upon which some of the suspension webs are longer than the other suspension webs so that the canopy will be given an angular tilt to the horizontal during a parachute descent for the purpose of permitting air spill and thus damp out oscillation.
Figure 3:
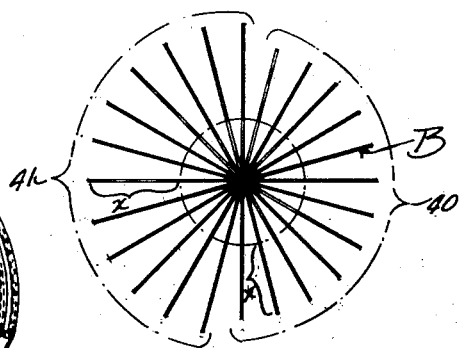
Figure 3 is a developed view of a modified form of parachute shroud line construction in which one-half of the parachute shroud lines are of the same length, measured from the apex or margin of the canopy to the point of load suspension, than are the remaining lines.
Figure 5:
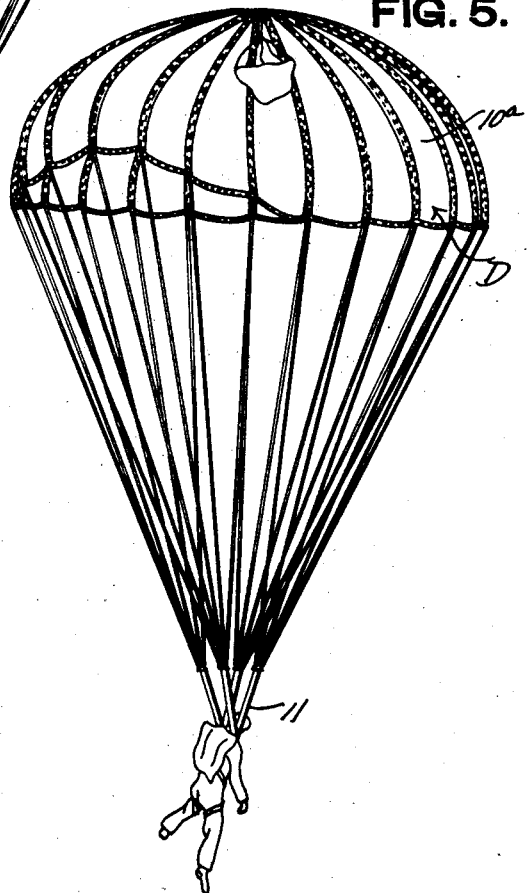
Figure 5 is a further modified form of the invention in which one group of the shroud lines, preferably attached to merely one of the suspension webs, are longer than the other shroud lines.
Figure 6:
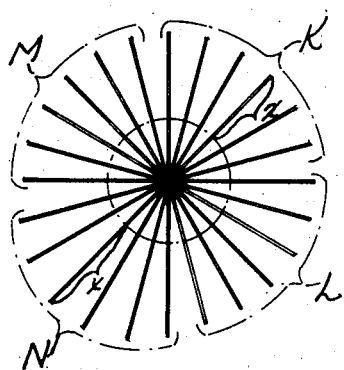
Figure 6 is a developed view of the shroud line structure for the modified form of invention shown in Figure 5.

In the drawings, wherein similar reference characters designate corresponding parts throughout the several views, the letter A may generally designate the preferred form of invention shown in Figures 1 and 2; the letter B may generally designate another modified form of the invention, as shown in Figure 3; the letter C may generally designate another form of parachute construction shown in Figure 4, and D may designate another form of parachute construction shown in Figures 5 and 6.

Each form of the invention includes a preferably circular type of parachute canopy 10. This canopy may be of standard construction such as is shown in U. S. Patent #1,427,772, although it may depart therefrom if desired. The circular type of parachute canopy has been found to be the most efficient and the safest to use because of its regular contour. The harness generally designated at 11 is preferably of standard construction such as is shown in U. S. Patent #1,560,366 although it may be of the single release type such as is shown in U. S. Patent #1,899,656 or it may be of the type used with the emergency quick connector pack, such as is shown in U. S. Patent #1,958,000. The standard harness usually employs four suspension webs 12 which are connected as part of the harness adjacent to the shoulders, or in the vicinity of the shoulders of a wearer; these riser webs extending above the head of the wearer during a parachute descent. The shroud lines are bunched into four groups, each group being connected to D-rings at the terminals of the suspension webs 12. If it is desired to use an emergency quick connector pack with the parachute harness, the latter may generally be of the construction shown in the aforementioned Hamer Patent #1,958,000 or the harness may have on it fixed connector rings for complementary connection with the coupling parts of the quick connector pack; these connector rings being attached at a fixed location on the riser webs of the harness in the vicinity of a chest of a wearer. With this construction there are no suspension webs extending above the head of the wearer during a parachute descent. Such type of harness is shown in U. S. application Serial No. 133,054 filed March 25, 1937.

In parachute construction each shroud line extends from the harness attached to the load to the marginal edge of the parachute, diametrically across the parachute, and thence downwardly at the opposite side of the parachute and continues to form a diametrically opposed shroud line, also connected to the harness, as is shown in the developed view in Figure 2.

In the preferred form of invention A, the shroud lines are of proportionately increasing or decreasing length measured from their connection with the harness to the peripheral edge of the parachute canopy. Thus, as is shown in Figure 2 of the drawings the shroud line 20 from the point of its connection with the harness to the marginal or peripheral edge of the parachute preferably measures 14' 6". This distance is designated at "$x$" in Figure 2 of the drawings. The shroud lines at each side for this same distance "$x$" increase in dimension preferably three inches, and this proportionate increase continues until the shroud line 32 is reached which is diametrically opposed to the shroud line 20, and for the distance "$x$" measures 17' 16". Thus it can be seen that the shroud lines from the shorter shroud line 20 progressively increase in length to a point diametrically opposed to the shroud line 20. The shroud lines are divided into four groups D, E, F and G, which at their lower ends are tied together, that is, the shroud lines in each group are tied together, or otherwise connected and attached in the usual manner, preferably by D-rings to the four harness suspension webs 12, as is shown in Figure 1 of the drawings. The length value of the shroud lines measured for the distance "$x$" for the twenty-four shroud lines of the parachute are as follows:

| Shroud line No. | Length | Shroud line No. | Length |
|---|---|---|---|
| | ' " | | ' " |
| 20 | 14 6 | 32 | 17 6 |
| 21 | 14 9 | 33 | 17 3 |
| 22 | 15 0 | 34 | 17 0 |
| 23 | 15 3 | 35 | 16 9 |
| 24 | 15 6 | 36 | 16 6 |
| 25 | 15 9 | 37 | 16 3 |
| 26 | 16 0 | 38 | 16 0 |
| 27 | 16 3 | 39 | 15 9 |
| 28 | 16 6 | 40 | 15 6 |
| 29 | 16 9 | 41 | 15 3 |
| 30 | 17 0 | 42 | 15 0 |
| 31 | 17 3 | 43 | 14 9 |

With the above arrangement during a parachute descent the plane in which the lower margin of the parachute canopy lies will be at an angle of 11½° to the horizontal, as is designated in Figure 1. The canopy will assume this position without any manual intervention and thus insures that an unskilled individual may drop with the parachute and due to the air spill of the parachute at the up side of the skirt there will be little likelihood of oscillation.

In the form of invention B, shown diagrammatically in Figure 3, the shroud lines are divided into groups 40 and 41. The group of shroud lines 40 for the distance "$x$" are all of the same length, and in the group 40 each shroud line for the distance "$x$" are all of the same length, but that length is greater than the length "$x$" of the shroud lines in group 40. This distance of course is likewise measured from the periphery of the parachute canopy to the point of attachment with the harness or load application. This insures that the parachute canopy at the peripheral edge to which the shroud lines in group 41 are attached will be at an elevation higher than the opposite side of the canopy to which the shroud lines in group 40 are attached; thus permitting air spill and likewise damping out oscillations.

In the form of invention C the structure of the harness 11$^a$ is altered so that two of the suspension straps 12$^a$ are of the same length and the other two, preferably rear straps, 12$^b$, are of the same length but greater than the length of the straps 12$^a$. This insures that when the shroud lines are connected therewith, during a parachute descent, the canopy will be inclined at its lower peripheral edge to the horizontal for the purpose of gliding the parachute during descent, and thus damping out oscillations.

In the form of parachute construction D the canopy 10$^a$ is of the same circular construction as the canopy 10 in the form of invention A, and the shroud lines are divided into four groups K, L, M, and N. The shroud lines measured for the distance "$x$" are all of the same dimension in each of groups K, L, and M. However, in the group N the shroud lines for the distance "$x$" may all be of greater length than the length of shroud lines in the groups K, L, and M. Indeed, these shroud lines in the group N may be progressively increased in length, within the group, as is diagrammatically represented in Figure 6. The result of this parachute construction, during a parachute descent, is shown in Figure 5, wherein the portion of the parachute canopy to which the shroud lines in the group N are connected will be bulged upwardly during a parachute descent; thus permitting air spill and tending to damp out oscillation.

The characteristics of all of the forms of invention, above described, may be used with any type of parachute harness, and it is not necessary to use parachute harnesses where the suspension straps extend upwardly above the head of the parachutist. In some parachutes the shroud lines may be connected directly upon a portion of the parachute harness, such as the belt or riser webs. These characteristics may also be used in connection with the detachable emergency pack such as shown in the above identified Hamer Patent #1,958,000. In that case the parachute shroud line length would be measured from the point of attachment of the coupling parts on the pack container to the peripheral edge of the parachute, as will be quite obvious to one skilled in the art.

Various changes in the shape, size, and arrangement of parts may be made to the forms of invention herein shown and described, without departing from the spirit of the invention or the scope of the claims.

I claim:

1. In parachute apparatus the combination of a circular type parachute canopy, a parachute harness having lift webs, and shroud lines connecting the parachute harness with the canopy, said shroud lines being non-extensible in length from the point of their connection with the lift webs of the harness to the point of their connection with the margin of the parachute, some of said shroud lines from the margin of the parachute to their connection with the lift webs of the harness being longer than others to permit uniform lateral upward deflection of the canopy at the point of connection with the longer line so as to permit air spill at that point.

2. In a parachute the combination of a canopy, a parachute harness having lift webs, and shroud lines which are non-extensible and non-adjustable in length connecting the canopy with the lift webs of the harness, said shroud lines progressively increasing in length around each side of the parachute measured from their connection with the lift webs of the parachute harness to the peripheral edge of the canopy.

3. In a parachute construction the combination of a parachute canopy, shroud lines, and a harness having front and rear non-extensible suspension webs of unequal lengths to the ends of which the shroud lines are connected in grouped relation the front webs being the shortest and the shroud lines having fixed connection with both the canopy and webs.

4. In a parachute construction a circular canopy, a harness having lift webs, and shroud lines connected with the canopy and with the harness for supporting a load, a few of the shroud lines which are in adjacent relation being relatively longer than the other shroud lines measured from the edge of the parachute canopy to the point of their connection with the lift webs of the harness, said shroud lines having fixed connections with the canopy and with the lift webs of the harness whereby the portion of the canopy to which the longer shroud lines are connected will bulge and assume a tilted position without any action on the part of the operator during a parachute descent, whereby to enable the parachute canopy to glide with a tendency to damp out oscillations.

JOSEPH HARBIT POOL.